(12) United States Patent
Nagasawa

(10) Patent No.: US 12,384,317 B2
(45) Date of Patent: Aug. 12, 2025

(54) OCCUPANT PROTECTION APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 220 days.

(21) Appl. No.: 18/313,702

(22) Filed: May 8, 2023

(65) Prior Publication Data

US 2023/0382338 A1 Nov. 30, 2023

(30) Foreign Application Priority Data

May 25, 2022 (JP) ................. 2022-084886

(51) Int. Cl.
*B60R 21/0136* (2006.01)
*B60R 21/00* (2006.01)
*B60R 21/01* (2006.01)

(52) U.S. Cl.
CPC .. *B60R 21/0136* (2013.01); *B60R 2021/0004* (2013.01); *B60R 2021/002* (2013.01); *B60R 2021/01252* (2013.01); *B60R 2021/01286* (2013.01)

(58) Field of Classification Search
CPC ........ B60R 21/0136; B60R 2021/0004; B60R 2021/002; B60R 2021/01252; B60R 2021/01286
USPC .......................................... 701/45
See application file for complete search history.

(56) References Cited

FOREIGN PATENT DOCUMENTS

DE 102017209061 A1 * 12/2018 ........ B60R 21/0134
JP 2009-090816 A 4/2009

* cited by examiner

*Primary Examiner* — Lindsay M Low
*Assistant Examiner* — Omar Morales
(74) *Attorney, Agent, or Firm* — Rimon P.C.

(57) ABSTRACT

An occupant protection apparatus to be applied to a vehicle includes a contact detector, a control processor, and a lifting mechanism. The contact detector detects frontal contact of the vehicle. The control processor includes a contact determination unit determining whether the frontal contact of the vehicle is underride contact based on a result of detecting by the contact detector. The lifting mechanism includes a lifting member and a lifting driver. The lifting member is disposed below a rear end part of a hood in a downward direction of the vehicle. The hood is disposed on a frontal part of the vehicle. The lifting driver transmits a driving force to the lifting member. When the contact determination unit determines that the frontal contact is the underride contact, the rear end part of the hood is lifted by the lifting mechanism.

3 Claims, 5 Drawing Sheets

OCCUPANT PROTECTION APPARATUS

CROSS-REFERENCE TO RELATED APPLICATIONS

The present application claims priority from Japanese Patent Application No. 2022-084886 filed on May 25, 2022, the entire contents of which are hereby incorporated by reference.

BACKGROUND

The disclosure relates to an occupant protection apparatus.

Frontal contact of a vehicle includes underride contact. Upon underride contact, a vehicle slides underneath a contact body. For example, a collision determination device disclosed in Japanese Unexamined Patent Application Publication No. 2009-90816 determines whether frontal contact of a vehicle is underride contact. When determining that the frontal contact is underride contact, the collision determination device operates a passenger protection device such as a seatbelt device at an appropriate timing.

SUMMARY

An aspect of the disclosure provides an occupant protection apparatus to be applied to a vehicle. The occupant protection apparatus includes a contact detector, a control processor, and a lifting mechanism. The contact detector is configured to detect frontal contact of the vehicle. The control processor includes a contact determination unit configured to determine whether the frontal contact of the vehicle is underride contact based on a result of detecting by the contact detector. The lifting mechanism includes a lifting member and a lifting driver. The lifting member is disposed below a rear end part of a hood in a downward direction of the vehicle. The hood is disposed on a frontal part of the vehicle. The lifting driver is configured to transmit a driving force to the lifting member. When the contact determination unit determines that the frontal contact is the underride contact, the rear end part of the hood is lifted by the lifting mechanism.

An aspect of the disclosure provides an occupant protection apparatus to be applied to a vehicle. The occupant protection apparatus includes circuitry and a lifting mechanism. The circuitry is configured to detect frontal contact of the vehicle and determine whether the frontal contact of the vehicle is underride contact based on a result of detecting. The lifting mechanism includes a lifting member and a lifting driver. The lifting member is disposed below a rear end part of a hood in a downward direction of the vehicle. The hood is disposed on a frontal part of the vehicle. The lifting driver is configured to transmit a driving force to the lifting member. When the circuitry determines that the frontal contact is the underride contact, the rear end part of the hood is lifted by the lifting mechanism.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
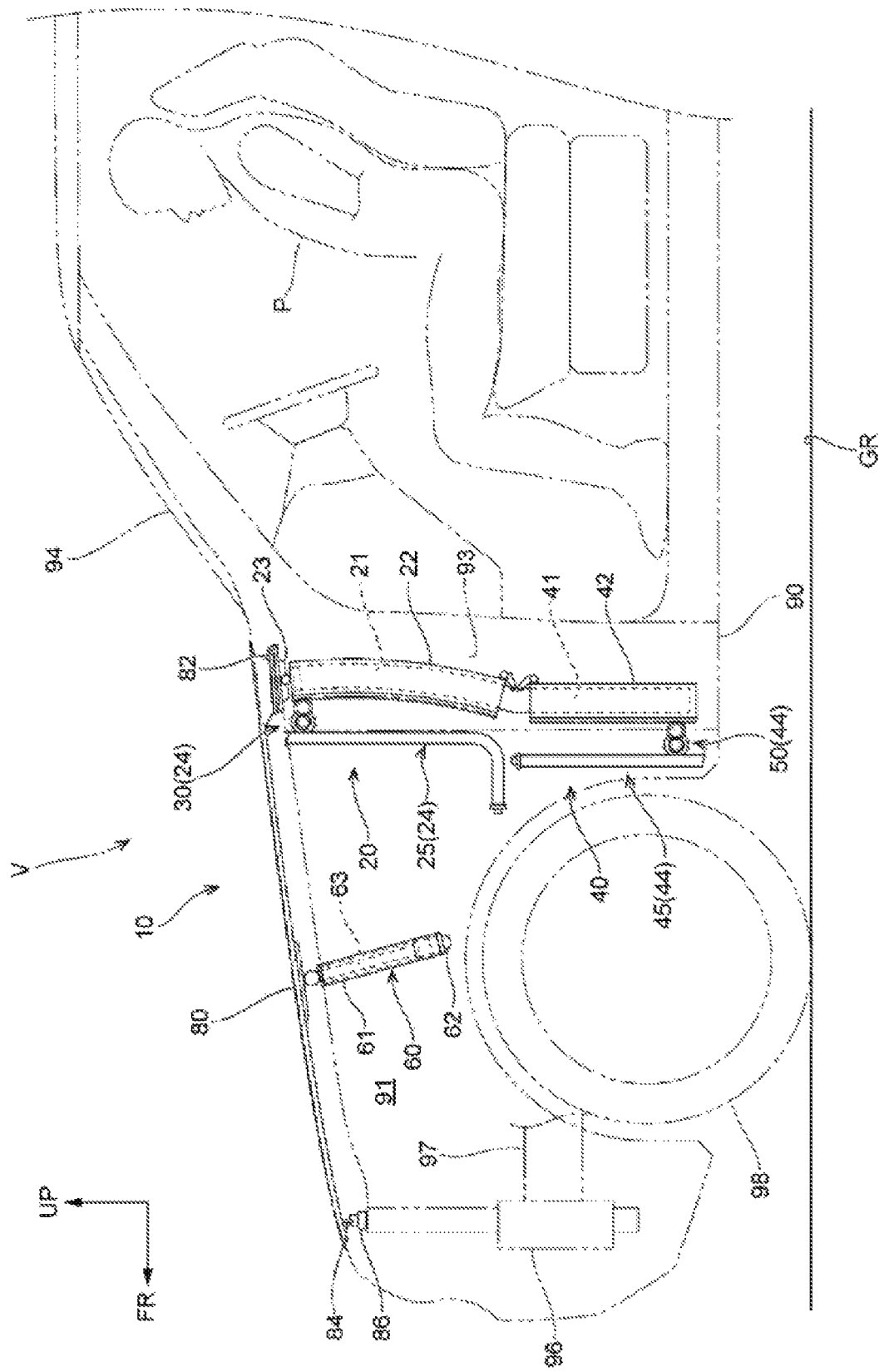
FIG. 1 is a schematic left side view of a frontal part of a vehicle to which an occupant protection apparatus according to one example embodiment is applied.

Upon underride contact, a vehicle slides underneath a contact body. A lap amount between the vehicle and the contact body is thus relatively small upon the underride contact. This can hinder contact energy generated upon the contact from being sufficiently absorbed, lowering performance to protect an occupant in the vehicle. It is therefore desired for a vehicle to have a structure that makes it possible to achieve superior performance to protect an occupant in the vehicle upon underride contact.

It is desirable to provide an occupant protection apparatus that makes it possible to achieve superior performance to protect an occupant in a vehicle upon underride contact.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

An occupant protection apparatus 10 according to an example embodiment will now be described with reference to the accompanying drawings. Note that, in the drawings, an arrow UP indicates an upward direction of a vehicle (an automobile) V to which the occupant protection apparatus 10 is applied, an arrow FR indicates a frontward direction of the vehicle V, and an arrow RH indicates a righthand direction (one vehicle-width direction) of the vehicle V. Hereinafter, descriptions of directions are made based on the upward and downward directions (also referred to as a vertical direction), the frontward and rearward directions (also referred to as a longitudinal direction), and the righthand and left-hand directions (also referred to as a vehicle-width direction) of the vehicle V unless otherwise stated.

As illustrated in FIGS. 1 to 5, the occupant protection apparatus 10 may include a pair of right and left lifting mechanisms 20, a pair of right and left anchor mechanisms 40, and a pair of right and left sub-lifting actuators 60. The lifting mechanisms 20 are configured to lift a rear end part of a hood 80 disposed on a frontal part of the vehicle V. The anchor mechanisms 40 may be configured to project from an underfloor 90 of the vehicle V in the downward direction and come into contact with the ground GR (i.e., to be lowered to a grounded position). The sub-lifting actuators 60 may be configured to lift a longitudinally intermediate part of the hood 80. In the broad sense, the sub-lifting actuators 60 may serve as sub-lifting mechanisms. The occupant protection apparatus 10 further includes an electronic control unit (ECU) 70. The ECU 70 may control operations of the lifting mechanisms 20, the anchor mechanisms 40, and the sub-lifting actuators 60. In one embodiment, the ECU 70 may serve as a "control processor". When the lifting mechanisms 20 and the sub-lifting actuators 60 are operated, the rear end part of the hood 80 may be lifted by the lifting mechanisms 20 and the sub-lifting actuators so that the head of an occupant P is hidden behind (covered with) the hood 80 as seen from in front of the vehicle V (see FIG. 5). In the following, the hood 80 is described in detail first, following which components of the occupant protection apparatus 10 are described in detail.

<Hood 80>

The hood 80 may have a substantially rectangular panel-like shape having a thickness in the vertical direction. The hood 80 may be disposed on the frontal part of the vehicle V so as to close an engine room 91 from above. The hood 80 may be provided with a pair of hood hinges 82 disposed below respective vehicle-width ends of the rear end part of the hood 80. The hood hinges 82 may each include a hinge base 82A and a hinge arm 82B. The hinge base 82A may have a substantially elongated plate-like shape having a thickness in the vertical direction and extending in the longitudinal direction. The hinge base 82A may be disposed above a non-illustrated cowl constituting a framework of the vehicle V, and may be fastened and fixed to the cowl. The hinge arm 82B may be disposed substantially in parallel to the hood 80 between the hinge base 82A and the rear end part of the hood 80, and may be fastened and fixed to the hood 80. A rear end part of the hinge arm 82B may be coupled to a rear end part of the hinge base 82A so as to be rotatable about an axis extending in the vehicle-width direction. The rear end part of the hood 80 may be thereby coupled to the body of the vehicle V with the hood hinges 82 so as to be rotatable around an axis extending in the vehicle width direction. A striker 84 may be provided on a vehicle-width intermediate part of a frontal end part of the hood 80. The striker 84 may project in the downward direction as illustrated in FIG. 1, and a lower end of the striker 84 may be locked with a hood lock device 86 fixed to the body of the vehicle V. The hood 80 may be thereby kept at a closed position so as to close the engine room 91.

<Lifting Mechanism 20>

The lifting mechanisms 20 may be disposed below the respective hood hinges 82. The lifting mechanisms 20 may each include a lifter supporting member 21, a lifter 22, and a lifting driver 24. In the broad sense, the lifter supporting member 21 may serve as a lifting supporting member. In one embodiment, the lifter may serve as a "lifting member". The lifter supporting member 21 may have a pillar shape extending in a substantially vertical direction. The lifter supporting member 21 may be disposed inside a front pillar 93 of the vehicle V and fixed to the front pillar 93. The lifter supporting member 21 may be curved into a substantially arc-shape that protrudes in the rearward direction in side view. For example, the lifter supporting member 21 may be curved into an arc-shape the center of which is located at a lower end of the striker 84 in side view.

Figure 3:
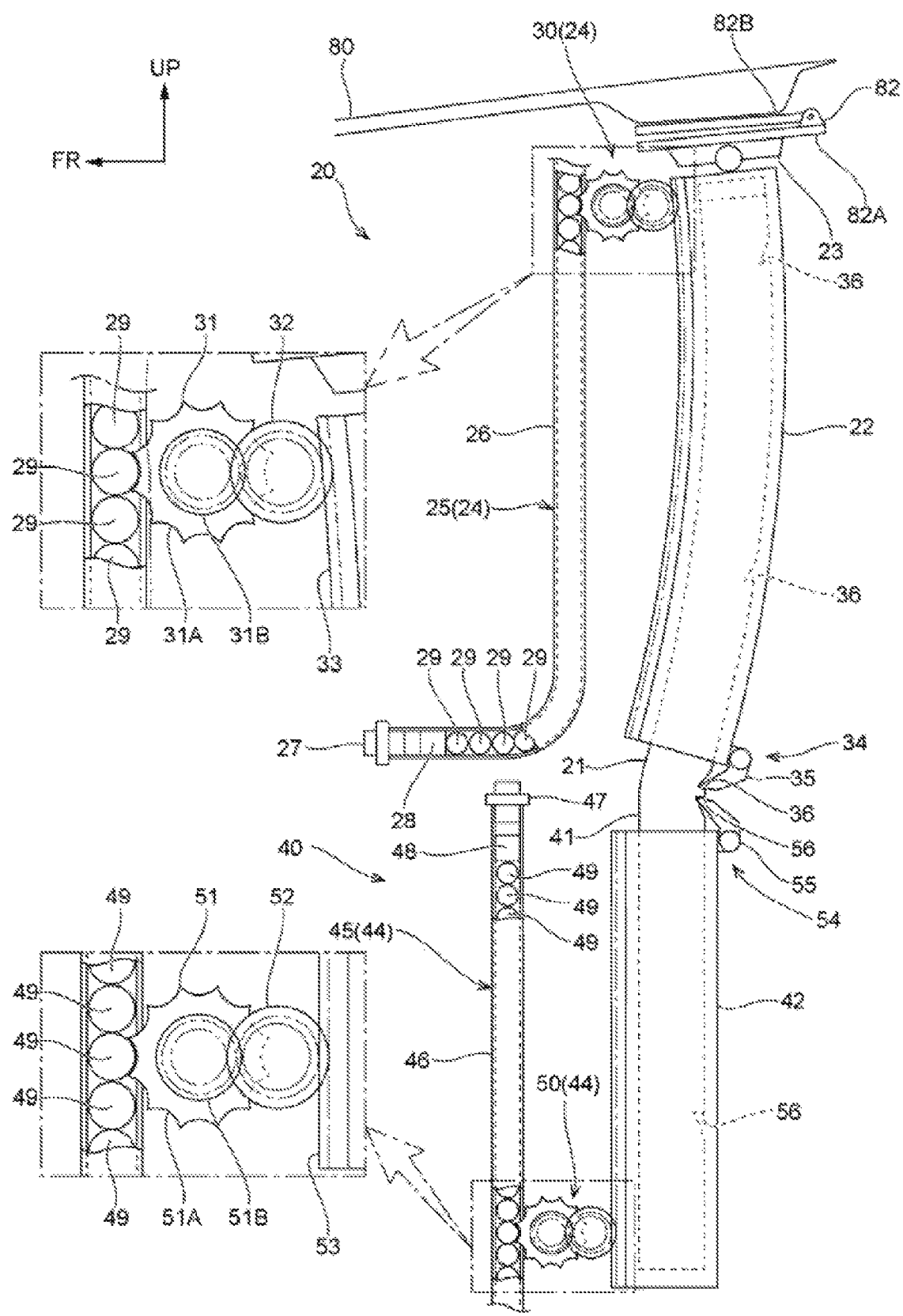
FIG. 3 is an enlarged side view of a lifting mechanism and an anchor mechanism illustrated in FIG. 1.
Figure 4:
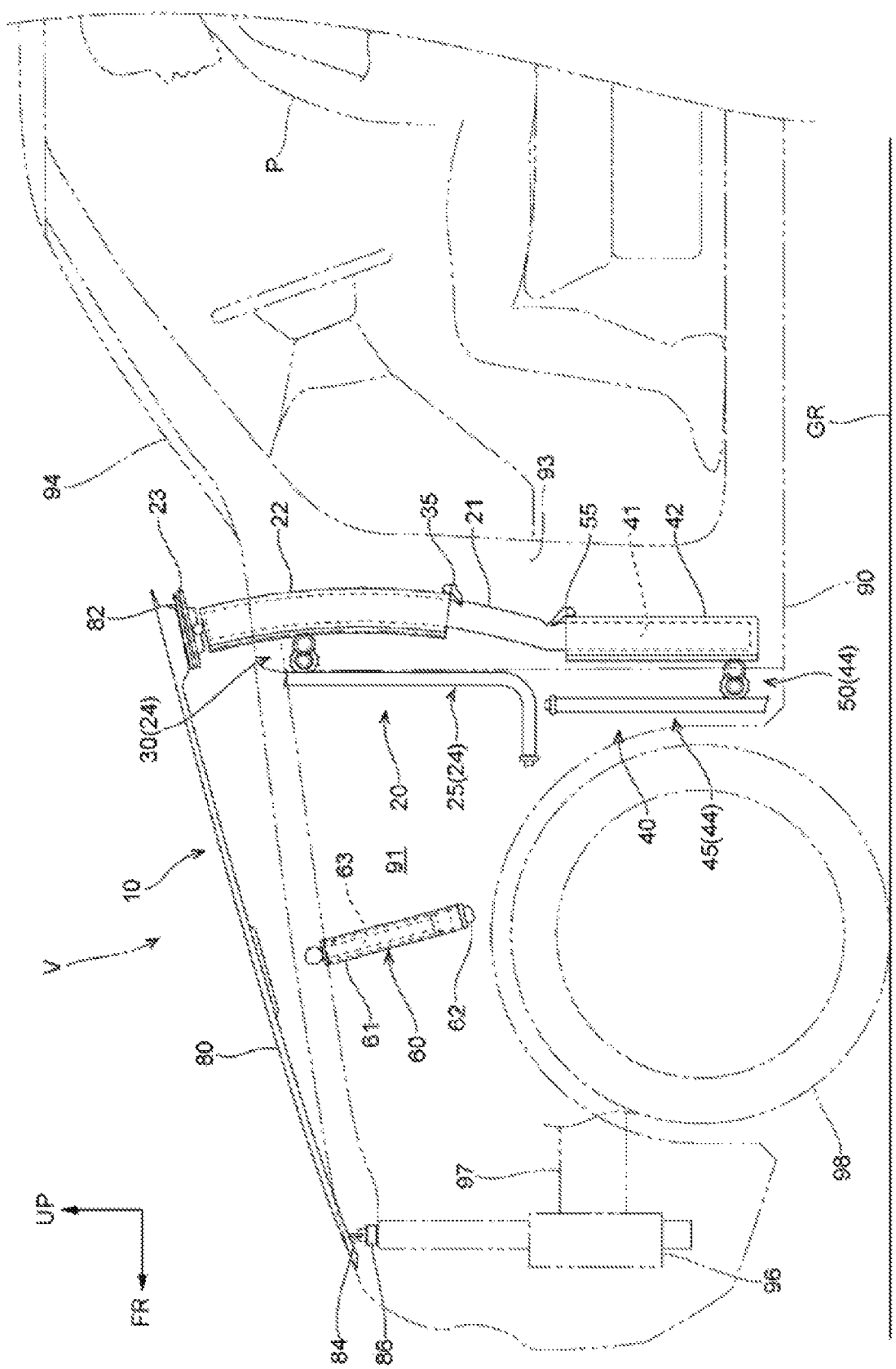
FIG. 4 is a side view of a lifter of the lifting mechanism illustrated in FIG. 1 that is raised to a first lifted position.
Figure 5:
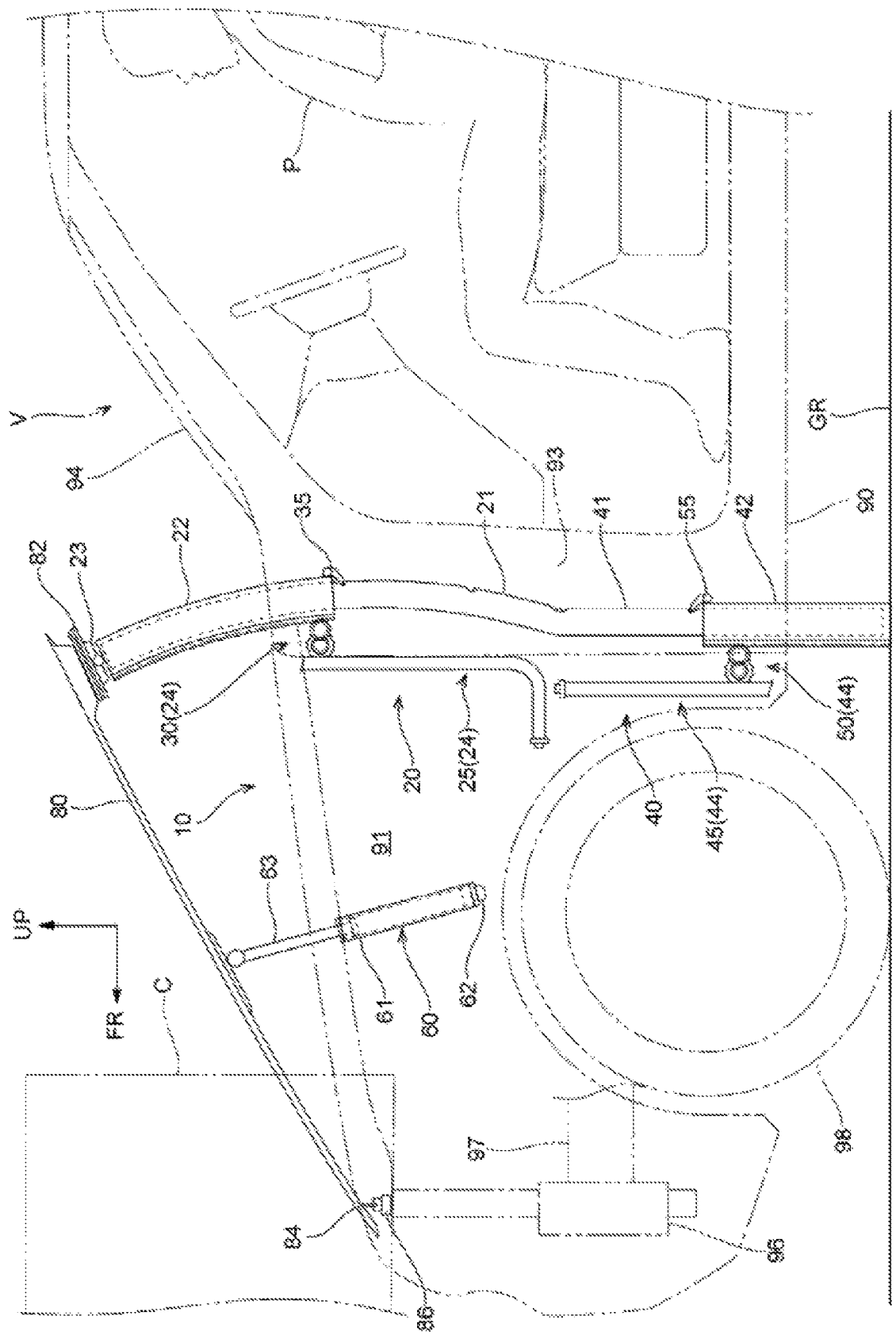
FIG. 5 is a side view of the lifter of the lifting mechanism illustrated in FIG. 1 that is raised to a second lifted position and an anchor of the anchor mechanism illustrated in FIG. 1 that is lowered to a ground position.

The lifter 22 may have a substantially bottomed cylindrical shape that opens in the downward direction. Like the lifter supporting member 21, the lifter 22 may be curved into a substantially arc-shape that protrudes in the rearward direction in side view. The lifter supporting member 21 may extend inside the lifter 22. The lifter 22 may be coupled to the lifter supporting member 21 so as to be movable relative to the lifter supporting member 21 in the vertical direction (i.e., along a longitudinal length of the lifter supporting member 21) and so as not to be movable relative to the lifter supporting member 21 in a circumferential direction of the lifter supporting member 21. For example, when the lifting mechanism 20 is not operated, the lifter 22 may be located at an initial position as illustrated in FIGS. 1 and 3. When the lifting mechanism 20 is operated, the lifter 22 may be located at a first lifted position as illustrated in FIG. 4 or a second lifted position as illustrated in FIG. 5. Note that the first lifted position may be above the initial position, and the second lifted position may be above the first lifted position.

An upper end of the lifter 22 may be disposed below the hinge base 82A and coupled to the hinge base 82A with a ball joint 23. The lifter 22 may thus be coupled to the rear end part of the hood 80 with the hood hinge 82 and the ball joint 23. When the lifting mechanism 20 is operated, the fixed state of the hinge base 82A to the body of the vehicle V may be released by a lifting force applied from the lifter 22 to the hinge base 82A, so that the rear end part of the hood 80 is lifted together with the lifter 22 to a position corresponding to the first lifted position of the lifter 22 or a position corresponding to the second lifted position of the lifter 22.

When the lifter 22 is lifted to the second lifted position, the rear end part of the hood 80 may be located at a vertical position where the rear end part of the hood overlaps with the head of the occupant P, as illustrated in FIG. 5. Accordingly, when the lifter 22 is lifted to the second lifted position, the upper body of the occupant P may be hidden behind the hood 80 in front view. In the present example embodiment, when the lifter 22 is lifted to the second lifted position, the rear end part of the hood 80 may be lifted to a height substantially the same as that of an upper end of a windshield glass 94 of the vehicle V so that substantially the entire of the windshield glass 94 is hidden behind the hood 80 in front view. Note that, in the present example embodiment, the position of the head of the occupant P may be assumed to be the position of the head of a crash-test dummy seated in the driver's seat of the vehicle V. The crash-test dummy may be a human dummy representing a 50th percentile American male (AM50).

As to be described in detail later, when the lifter 22 is lifted to the first lifted position, the rear end part of the hood 80 may be located at a predetermined height to receive the head of a person (pedestrian) falling onto the hood 80. That is, the height of the hood 80 at the position corresponding to the first lifted position of the lifter 22 may be determined to secure the performance to protect a person (pedestrian) falling onto the hood 80.

As illustrated in FIG. 3, the lifting driver 24 may include a lifting actuator and a driving power transmitter 30. The lifting actuator 25 may include a pipe 26 having an elongated shape. The pipe 26 may be disposed in front of the lifter 22 and fixed to the body of the vehicle V. A micro-gas generator 27 (hereinafter referred to as a MGG 27) may be provided at one end of the pipe 26. In the broad sense, the MGG 27 may serve as a gas generator. When the MGG 27 is operated, gas generated by the MGG 27 may be supplied to inside the pipe 26. The MGG 27 may be a two-stage gas generator configured to switch the level of a gas output between two levels, i.e., a low output level and a high output level. The MGG 27 may include two squibs, for example. When the MGG 27 is operated at the low output level, one of the squibs may be activated to burn an ignition agent. When the MGG 27 is operated at the high output level, the two squibs are both activated to burn the ignition agent. The MGG 27 may be electrically coupled to the ECU 70 to be described later so that an operation of the MGG 27 is controlled by the ECU 70.

A piston 28 having a columnar shape may be disposed inside the pipe 26 in a movable manner. The piston 28 may be disposed closer to the other end of the pipe 26 than the MGG 27 is. Further, a plurality of balls 29 may be disposed inside the pipe 26 in a movable manner. The balls 29 may be disposed closer to the other end of the pipe 26 than the piston 28 is. Accordingly, when the gas generated by the MGG 27 is supplied to inside the pipe 26, the piston 28 may be moved toward the other end of the pipe 26 by a gas pressure inside the pipe 26, and may push the balls 29. The balls 29 and the piston 28 may be thereby moved toward the other end of the pipe 26.

The driving power transmitter 30 may be disposed between an upper end part of the lifter 22 and the pipe 26. The driving power transmitter 30 may include a pinion 31, a transmission gear 32, and a rack 33 that is provided on the lifter 22. The pinion 31 may be a two-stage gear that includes a first pinion gear 31A and a second pinion gear 31B. A part of the first pinion gear 31A may be disposed inside the pipe 26 such that the first pinion gear 31A engages with the balls 29. The second pinion gear 31B and the transmission gear 32 may be in mesh, and the transmission gear 32 may have a larger diameter than the second pinion gear 31B. The rack 33 may extend on an outer circumference of the lifter 22 along a longitudinal length of the lifter 22, and the transmission gear 32 and the rack 33 may be in mesh. Accordingly, when the MGG 27 is operated to move the balls 29 toward the other end of the pipe 26, the pinion 31 and the transmission gear 32 may be rotated to raise the lifter 22 from the initial position. For example, the lifter 22 may be raised to the first lifted position when the MGG 27 is operated at the low output level, and to the second lifted position when the MGG 27 is operated at the high output level. Note that the pinion 31 and the transmission gear 32 may be rotatably supported by a non-illustrated gear holder fixed to the body of the vehicle V.

The lifting driver 24 may further include a lock mechanism 34. The lock mechanism 34 may hold the lifter 22 raised to the first lifted position or the second lifted position. The lock mechanism 34 may include a lock member 35 that is rotatably coupled to a lower circumferential end of the lifter 22. The lock member may be configured to engage with any of lock grooves 36 provided on the lifter supporting member 21. When the lock member 35 engages with any of the lock grooves 36, the lifter 22 is prevented from moving in the downward direction. The lock grooves 36 may be provided at respective positions corresponding to the initial position, the first lifted position, and the second lifted position of the lifter 22. When the lifter 22 is raised to the first lifted position or the second lifted position, the lock member 35 may engage with the corresponding lock groove 36. The lock member 35 may be urged by a non-illustrated urging member in a direction in which the lock member 35 is to engage with the lock groove 36. While the lifter 22 is being raised, the lock member 35 may be caused to slide on the outer circumference of the lifter supporting member 21 by an urging force of the urging member.

<Anchor Mechanism 40>

As illustrated in FIGS. 1 and 3, the anchor mechanisms 40 may be disposed below the respective lifting mechanisms 20. The anchor mechanisms 40 may each include an anchor supporting member 41, an anchor member 42, and an anchor driver 44. The anchor supporting member 41 may have a pillar shape extending in the vertical direction. The anchor supporting member 41 may be disposed inside the front pillar 93 of the vehicle V and fixed to the front pillar 93. An upper end of the anchor supporting member 41 may be coupled to a lower end of the lifter supporting member 21 of the lifting mechanism 20. That is, in the present example embodiment, the anchor supporting member 41 and the lifter supporting member 21 may be integrated with each other into a single member. Alternatively, the anchor supporting member 41 and the lifter supporting member 21 may be members separate from each other.

The anchor member 42 may have a substantially bottomed cylindrical shape that opens in the upward direction. The anchor supporting member 41 may extend inside the anchor member 42. The anchor member 42 may be coupled to the anchor supporting member 41 so as to be movable relative to the anchor supporting member 41 in the vertical direction (i.e., along a longitudinal length of the anchor supporting member 41) and so as not to be movable relative to the anchor supporting member 41 in a circumferential direction of the anchor supporting member 41. For example, when the anchor mechanism 40 is not operated, the anchor member 42 may be located at an initial position as illustrated in FIGS. 1 and 3. When the anchor member 42 is located at the initial position, the anchor member 42 may not project from the underfloor 90 of the vehicle V in the downward direction. When the anchor mechanism 40 is operated, the anchor member 42 may be lowered from the initial position to the grounded position as illustrated in FIG. 5. When the anchor mechanism 40 is lowered to the grounded position, a lower end of the anchor member 42 may come into contact with the ground GR, that is, the lower end of the anchor member 42 may be grounded. Accordingly, the anchor mechanism 40 may apply a reaction force in the upward direction from the ground GR to the vehicle V. Note that the anchor member 42 located at the initial position may be held by a non-illustrated holding member.

The anchor driver 44 may have a configuration similar to that of the lifting driver 24 of the lifting mechanism 20. For example, the anchor driver 44 may include an anchor actuator 45 and a driving power transmitter 50. The anchor actuator 45 may include a pipe 46 having an elongated shape. The pipe 46 may be disposed in front of the anchor member 42 and fixed to the body of the vehicle V. A micro-gas generator 47 (hereinafter referred to as a MGG 47) may be provided at one end of the pipe 46. In the broad sense, the MGG 47 may serve as a gas generator. When the MGG 47 is operated, gas generated by the MGG 47 may be supplied to inside the pipe 46. Unlike the MGG 27 of the lifting mechanism 20, the MGG 47 may be a one-stage gas generator. The MGG 47 may be electrically coupled to the ECU 70 to be described later so that an operation of the MGG 47 is controlled by the ECU 70.

A piston 48 having a cylindrical shape may be disposed inside the pipe 46 in a movable manner. The piston 48 may be disposed closer to the other end of the pipe 46 than the MGG 47 is. Further, a plurality of balls 49 may be disposed inside the pipe 46 in a movable manner. The balls 49 may be disposed closer to the other end of the pipe 46 than the piston 48 is.

The driving power transmitter 50 may include a pinion 51, a transmission gear 52, and a rack 53 that is provided on the anchor member 42. The pinion 51 may be a two-stage gear that includes a first pinion gear 51A and a second pinion gear 51B. The first pinion gear 51A may engage with the balls 49. The second pinion gear 51B and the transmission gear 52 may be in mesh, and the transmission gear 52 may have a larger diameter than the second pinion gear 51B. The rack 53 may extend on an outer circumference of the anchor member 42 in the vertical direction, and the transmission gear 52 and the rack 53 may be in mesh. Accordingly, when the MGG 47 is operated to move the balls 49 toward the other end of the pipe 46, the pinion 51 and the transmission gear 52 may be rotated to lower the anchor member 42 from the initial position.

The anchor driver 44 may further include a lock mechanism 54. The lock mechanism 54 may prevent the anchor member 42 lowered to the grounded position from moving in the upward direction. Like the lock mechanism 34, the lock mechanism 54 may include a lock member 55 that is rotatably coupled to an upper circumferential end of the anchor member 42. The lock member 55 may be configured to engage with any of lock grooves 56 provided on the anchor supporting member 41. When the lock member 55 engages with any of the lock grooves 56, the anchor member 42 is prevented from moving in the upward direction. The lock grooves 56 may be provided at respective positions corresponding to the initial position and the grounded position of the anchor member 42. When the anchor member 42 is lowered to the grounded position, the lock member 55 may engage with the corresponding lock groove 56. The anchor member 42 may be urged by a non-illustrated urging member in a direction in which the anchor member 42 is to engage with the lock groove 56. While the anchor member 42 is being lowered, the lock member 55 may be caused to slide on the outer circumference of the anchor supporting member 41 by an urging force of the urging member.

<Sub-Lifting Actuator 60>

As illustrated in FIG. 1, the sub-lifting actuators 60 may be disposed below the respective vehicle-width ends of the longitudinally intermediate part of the hood 80. The sub-lifting actuators 60 may each include a cylinder 61, a micro-gas generator 62 (hereinafter referred to as a MGG 62), and a piston rod 63. In the broad sense, the MGG 62 may serve as a gas generator.

The cylinder 61 may have a cylindrical shape having an axis along a substantially vertical direction. The cylinder 61 may be fixed to the body of the vehicle V. For example, an upper part of the cylinder 61 may slightly incline in the forward direction in side view. The MGG 62 may be fit in a lower end of the cylinder 61. When the MGG 62 is operated, gas generated by the MGG 62 may be supplied into the cylinder 61. The MGG 62 may be electrically coupled to the ECU 70 to be described later so that an operation of the MGG 62 is controlled by the ECU 70.

The piston rod 63 may extend along the axis of the cylinder 61. A lower part of the piston rod 63 may be disposed inside the cylinder 61 in a movable manner. An upper end of the piston rod 63 may be disposed close to a lower side of the hood 80. As to be described in detail later, the sub-lifting actuator 60 may be operated together with the lifting mechanism 20 to lift the hood 80 to the position corresponding to the second lifted position of the lifter 22 in cooperation with the lifting mechanism 20.

<ECU 70>

Figure 2:
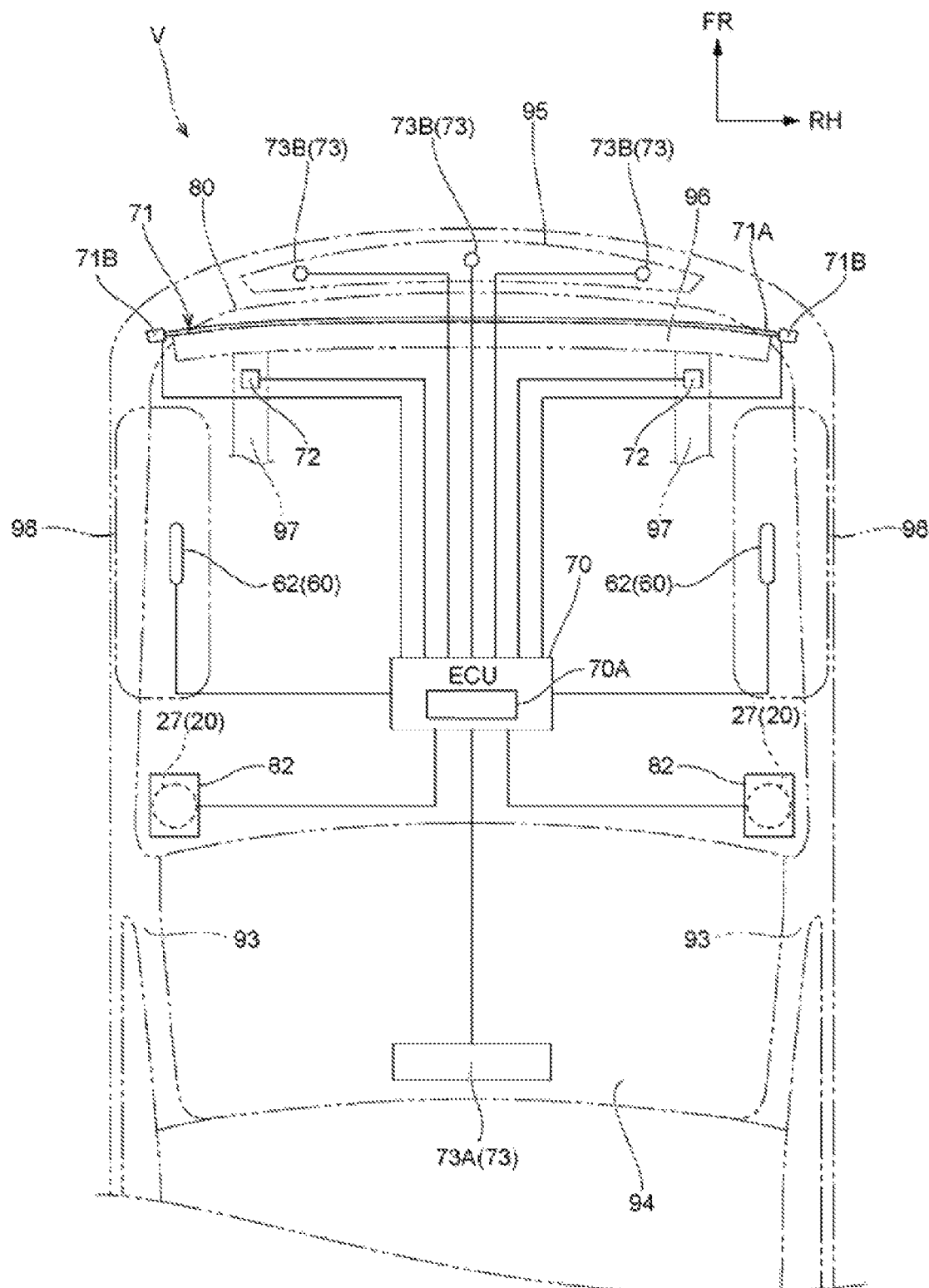
FIG. 2 is a schematic plan view of the frontal part of the vehicle illustrated in FIG. 1.

As illustrated in FIG. 2, the ECU 70 may be electrically coupled to the MGGs 27, 47, and 62 described above so that operations of the MGGs 27, 47, and 62 are controlled by the ECU 70. Further, a first contact detection sensor 71, second contact detection sensors 72, and third contact detection sensors 73 may be electrically coupled to the ECU 70. In one embodiment, the first contact detection sensor 71, the second contact detection sensors 72, and the third contact detection sensors 73 may each serve as a "contact detector". The ECU 70 may determine whether to operate the MGGs 27, 47, and 62 based on detection signals outputted from these sensors.

The first contact detection sensor 71 may be disposed in front of a bumper beam 96 provided on a frontal end part of the vehicle V. The first contact detection sensor 71 may include a pressure tube 71A and pressure sensors 71B. The pressure tube 71A may be an elongated hollow tube extending in the vehicle-width direction. The pressure sensors 71B may be disposed at respective longitudinal ends of the pressure tube 71A. When a contact body comes into contact with the frontal end part of the vehicle V, the pressure tube 71A may be compressed, changing the pressure inside the pressure tube 71A. The pressure sensor 71B may then output a signal based on the change in the pressure inside the pressure tube 71A to the ECU The second contact detection sensors 72 may be disposed on respective frontal end portions of right and left front side frames 97 in pair. The pair of front side frames may be disposed on the frontal part of the vehicle V and extend in the longitudinal direction of the vehicle V. The second contact detection sensors 72 may each serve as an acceleration sensor that outputs a signal based an acceleration rate inputted to the vehicle V to the ECU 70.

The third contact detection sensors 73 may include a stereo camera 73A and millimeter-wave radars 73B. The stereo camera 73A may be disposed on an upper part of the windshield glass 94 at a position near a vehicle-width intermediate position. The stereo camera 73A may capture an image of an environment in front of the vehicle V to detect a contact body in contact with the vehicle V, and may output measurement data including data on the image of the contact body to the ECU 70. The stereo camera 73A may measure, for example, a distance to the detected contact body and and a relative speed between the vehicle V and the contact body, and may output the measurement data to the ECU 70. The millimeter-wave radars 73B may be disposed on a bumper grill 95 that is disposed on the frontal end part of the vehicle V. The millimeter-wave radars 73B may each measure a position of the contact body, a distance to the contact body, and a speed of the contact body, and may output the measured data to the ECU 70.

The ECU 70 may include a contact determination unit 70A. The contact determination unit 70A may determine the type of frontal contact of the vehicle V based on a result of detection by the third contact detection sensors 73. For example, the contact determination unit 70A may determine whether the frontal contact of the vehicle V is underride contact, that is, whether the vehicle V has slid underneath the contact body. If it is determined by the contact determination unit 70A that the frontal contact of the vehicle V is underride contact, the ECU 70 may cause the MGGs 27 of the lifting mechanisms 20 to operate at the high output level, and may cause the MGGs 62 of the sub-lifting actuators 60 to operate. Further, if it is determined that the frontal contact of the vehicle V is underride contact, the ECU 70 may cause one or both of the MGG 47 of the right anchor mechanism 40 and the MGG 47 of the left anchor mechanism 40 to operate based on results of detection outputted from the second contact detection sensors 72 after the lifting mechanisms and the sub-lifting actuators 60 are operated (i.e., after an elapse of a predetermined time from the start of operations of the MGGs 27 and 62).

In contrast, if it is determined by the contact determination unit 70A that the frontal contact of the vehicle V is not underride contact, the contact determination unit 70A may determine whether the contact body in contact with the vehicle V is a person (pedestrian) based on the results of detection outputted from the first contact detection sensor 71 and the third contact detection sensors 73. If it is determined that the contact body in contact with the vehicle V is a person, the ECU may cause the MGGs 27 to operate at the low output level to thereby cause the lifting mechanisms 20 to operate, that is, the ECU 70 may keep the sub-lifting actuators 60 and the anchor mechanisms 40 in non-operational states. In contrast, if it is determined that the contact body in contact with the vehicle V is a contact body other than a person, the ECU 70 may keep the MGGs 27, 47, and 62 in non-operational states, that is, the ECU 70 may keep the lifting mechanisms 20, the anchor mechanisms 40, and the sub-lifting actuators 60 in non-operational states.

Workings and Effects

Now, workings and effects of the present example embodiment are described.

While the lifting mechanisms 20 and the sub-lifting actuators 60 are in the non-operational states, the hood 80 may be located at the closed position so as to close the engine room 91, as illustrated in FIG. 1. While the anchor mechanisms are in the non-operational states, the anchor members 42 may be located so as not to project from the underfloor 90 of the vehicle V in the downward direction. Thereafter, if the contact determination unit 70A of the ECU 70 detects frontal contact of the vehicle V other than underride contact based on the output signals from the first to third contact detection sensors 71 to 73 and determines that the contact body making frontal contact with the vehicle V is a person, the ECU 70 may cause the MGGs 27 of the lifting mechanisms 20 to operate at the low output level.

The lifting drivers 24 of the lifting mechanisms 20 may be thereby operated to raise the lifters 22 to the first lifted position as illustrated in FIG. 4. For example, gas may be supplied from the MGG 27 to inside the pipe 26, and the piston 28 may be moved toward the other end of the pipe 26 by the gas pressure inside the pipe 26. The piston 28 may push the balls 29 to thereby move together with the balls 29 toward the other end of the pipe 26. This may rotate the pinion 31 and the transmission gear 32 of the lifting mechanism 20, raising the rack 33 in mesh with the transmission gear 32. The lifter 22 may be thereby lifted from the initial position to the first lifted position, and the rear end part of the hood 80 may be lifted to the position corresponding to the first lifted position of the lifter 22. For example, while being lifted, the rear end part of the hood 80 may rotate around the lower end of the striker 84 locked with the hood lock device 86 provided on the frontal end part of the hood 80 in side view. As a result, the person (pedestrian) falling onto the hood 80 upon the frontal contact may be received by the hood 80 lifted to the position corresponding to the first lifted position of the lifter 22 with a space formed below the rear end part of the hood 80.

In contrast, if the contact determination unit 70A of the ECU 70 detects underride contact of the vehicle V based on the output signals from the first to third contact detection sensors 71 to 73, the ECU 70 may cause the MGGs 27 of the lifting mechanisms 20 to operate at the high output level and may cause the MGGs 62 of the sub-lifting actuators 60 to operate.

The lifting drivers 24 of the lifting mechanisms 20 may be thereby operated to raise the lifters 22, as in the manner described above. At this time, the MGGs 27 may be operated at the high output level, and the lifters 22 may thus be lifted to the second lifted position as illustrated in FIG. 5. Further, gas generated by the MGG 62 may be supplied to the cylinder 61 of the sub-lifting actuator 60, and the piston rod 63 may be raised by the gas pressure inside the cylinder 61, lifting the longitudinally intermediate part of the hood 80. Accordingly, the rear end part of the hood 80 may be lifted to the position corresponding to the second lifted position of the lifter 22 by the lifting mechanisms 20 and the sub-lifting actuators 60 so that the windshield glass 94 is hidden behind the hood 80 in front view. The contact body (e.g., a contact body C illustrated in FIG. 5) may be received by the hood 80 lifted to the position corresponding to the second lifted position of the lifter 22 to absorb contact energy applied to the vehicle V.

The contact determination unit 70A of the ECU 70 may determine the position of contact between the contact body C and the vehicle V in the vehicle-width direction based on the output signals received from the second contact detection sensors 72, and may cause, based on the result of the determination, the MGGs 47 of the anchor mechanisms 40 to operate. For example, when the contact body C comes into contact with a right part of the vehicle V, the MGG 47 of the right anchor mechanism 40 may be operated after the MGGs 27 and the MGGs 62 are operated. When the contact body C comes into contact with a left part of the vehicle V, the MGG 47 of the left anchor mechanism 40 may be operated after the MGGs 27 and the MGGs 62 are operated. That is, when the position of contact between the contact body C and the vehicle V is deviated from the vehicle-width intermediate part of the vehicle V, one of the MGGs 47 of the anchor mechanisms closer to the contact position with reference to the vehicle-width intermediate part of the vehicle V may be operated. When the contact body C comes into contact with a substantially intermediate part of the vehicle V in the vehicle-width direction, both of the MGG 47 of the right anchor mechanism 40 and the MGG 47 of the left anchor mechanism 40 may be operated after the MGGs 27 and the MGGs 62 are operated.

The anchor driver 44 of the anchor mechanism 40 may be thereby operated, and the anchor member 42 may be lowered from the initial position to project from the underfloor 90 of the vehicle V. For example, gas may be supplied from the MGG 47 to inside the pipe 46, and the piston 48 may be moved toward the other end of the pipe 46 by the gas pressure inside the pipe 46. The piston 48 may push the balls 49 to thereby move together with the balls 49 toward the other end of the pipe 46. This may rotate the pinion 51 and the transmission gear 52 of the anchor mechanism 40, lowering the rack 53 in mesh with transmission gear 52. The anchor member 42 may be thereby lowered from the initial position, bringing the lower end of the anchor member 42 into contact with the ground GR. Accordingly, an reaction force may be applied in the upward direction from the ground GR to the anchor member 42 and the anchor supporting member 41. The reaction force may be transmitted from the anchor supporting member 41 to the lifter 22 and the lifter supporting member 21 of the lifting mechanism 20, and may be applied to the contact body C through the hood 80.

As described above, the occupant protection apparatus 10 includes the lifting mechanisms 20, and the lifting mechanisms 20 each include the lifter 22 and the lifting driver. The lifter 22 may be coupled to the rear end part of the hood 80, and the lifting driver 24 is configured to apply a driving force to the lifter 22. When the contact determination unit 70A of the ECU 70 determines that the frontal contact of the vehicle V is underride contact, the ECU 70 may cause the lifting driver 24 to operate to raise the lifter 22 to the second lifted position, and the rear end part of the hood 80 may be lifted by the lifter 22. When the lifter 22 is located at the second lifted position, the rear end part of the hood 80 may be located at the vertical position where the hood 80 overlaps with the head of the occupant P. Accordingly, when the vehicle V makes underride contact by sliding underneath the contact body C, the hood 80 may serve as a screen (see FIG. 5). Upon the underride contact, the contact body C is received by the hood 80 lifted to the position corresponding to the second lifted position of the lifter 22, which prevents the contact body C from entering the cabin of the vehicle V. That is, upon the underride contact, the lap amount between the vehicle V and the contact body C is increased, and the contact energy generated upon the underride contact is absorbed by the hood 80 and the lifting mechanisms 20. It is therefore possible to improve the performance to protect the occupant P upon underride contact.

According to the occupant protection apparatus 10, when the contact determination unit 70A of the ECU 70 determines that the contact body C making frontal contact with the vehicle V is a person (pedestrian), the ECU 70 may cause the MGGs 27 of the lifting mechanisms 20 to operate at the low output level so that the rear end part of the hood 80 is lifted by the lifters 22 to the position corresponding to the first lifted position of the lifter 22. In contrast, when the contact determination unit 70A of the ECU 70 determines that the frontal contact of the vehicle V is underride contact, the ECU 70 may cause the MGGs 27 of the lifting mechanisms 20 to operate at the high output level so that the rear end part of the hood 80 is lifted by the lifters 22 to the position corresponding to the second lifted position of the lifter 22, as described above. In other words, the occupant protection apparatus 10 may be configured to lift the rear end part of the hood 80 to the two different lifted positions. This allows the hood 80 to serve differently depending on the types of the frontal contact. For example, upon underride contact, the hood may serve as a protection member that absorbs the contact energy generated upon the underride contact to protect the occupant P, whereas upon frontal contact with a person (pedestrian), the hood 80 may serve as a protection member that absorbs the contact energy generated upon the frontal contact to protect the person (pedestrian) falling onto the hood 80. Accordingly, upon frontal contact of the vehicle V with a person (pedestrian), it is possible to protect the person falling onto the hood 80 using the occupant protection apparatus 10 that absorbs the contact energy generated upon the underride contact.

The anchor mechanisms 40 may be disposed below the respective lifting mechanisms 20. The anchor mechanisms 40 may each include the anchor member 42 and the anchor driver 44 that applies a driving force to the anchor member 42. Upon underride contact, the anchor driver 44 may be operated by the ECU 70 to cause the anchor member 42 to project from the underfloor 90 of the vehicle V in the downward direction and come into contact with the ground GR. Accordingly, a reaction force may be applied in the upward direction from the ground GR to the anchor mechanism 40. The reaction force may be transmitted to the lifting mechanism 20 and applied to the contact body C through the rear end part of the hood 80. Further, a contact load applied from the contact body C to the hood 80 may be transmitted from the lifting mechanism 20 and the anchor mechanism 40 to the ground GR. Accordingly, it is possible to effectively improve the performance to protect the occupant P.

After operating the MGGs 27 of the lifting mechanisms 20, the ECU 70 may cause the MGGs 47 of the anchor mechanisms 40 to operate. Accordingly, it is possible to apply a reaction force from the hood 80 to the contact body C while stabilizing the state of the vehicle V upon underride contact. If the MGG s 47 of the anchor mechanisms 40 are operated before the MGGs 27 of the lifting mechanisms 20 are operated, wheels 98 of the vehicle V can leave the ground GR when the anchor members 42 come into contact with the ground GR. This can bring the vehicle V into an unstable state, making it difficult to apply an effective reaction force from the hood 80 to the contact body C. In contrast, in the present example embodiment, the MGGs 47 of the anchor mechanisms 40 may be operated after the MGGs 27 of the lifting mechanisms 20 are operated. Thus, at an early stage of the underride contact, the hood 80 lifted to the position corresponding to the second lifted position of the lifter 22 may come into contact with the contact body C to thereby apply a reaction force to the contact body C while the vehicle V is supported by the wheels 98. At a later stage of the underride contact, the anchor mechanisms 40 may increase the reaction force to be applied to the contact body C. Accordingly, it is possible to apply the reaction force from the hood 80 to the contact body C while stabilizing the state of the vehicle V upon underride contact.

The MGG 47 of the right anchor mechanism 40 may be operated when the contact body C comes into contact with a right part of the vehicle V, whereas the MGG 47 of the left anchor mechanism 40 may be operated when the contact body C comes into contact with a left part of the vehicle V. In other words, when the position of contact between the contact body C and the vehicle V is deviated from the intermediate part of the vehicle V in the vehicle-width direction, one of the MGGs 47 of the anchor mechanisms 40 closer to the position of the contact in the vehicle width direction may be operated. When the contact body C comes into contact with a substantially intermediate part of the vehicle V in the vehicle-width direction, both of the MGG 47 of the right anchor mechanism 40 and the MGG 47 of the left anchor mechanism 40 may be operated. This makes it possible to effectively apply a reaction force to the contact body C. When the position of contact between the contact body C and the vehicle V is deviated from the vehicle-width intermediate part of the vehicle V in the vehicle width direction, a yawing behavior of the vehicle V may be caused by operating one of the MGGs 47 of the anchor mechanisms 40 closer to the contact position. The contact energy applied to the vehicle V may be thereby converted into the yawing behavior of the vehicle V. This suppresses a deformation of the vehicle V upon the underride contact.

Further, the sub-lifting actuators 60 may be disposed below the respective vehicle-width ends of the longitudinally intermediate part of the hood 80. Upon underride contact, the ECU 70 may cause the sub-lifting actuators 60 to operate so that the hood 80 is lifted to the position corresponding to the second lifted position of the lifter 22 by the piston rods 63 of the sub-lifting actuators 60. Accordingly, the longitudinally intermediate part of the hood 80 lifted to the position corresponding to the second lifted position of the lifter 22 is supported by the sub-lifting actuators 60 upon the underride contact. This makes it possible to improve the function of supporting the hood 80 upon the underride contact and transmit the contact load applied to the hood 80 upon the contact of the contact body C with the hood 80 to the vehicle body of the vehicle V in a distributed manner.

Further, the lifting driver 24 of the lifting mechanism 20 may include the lifting actuator 25. The lifting actuator 25 may include the MGG 27 configured to be operated by the ECU 70. This allows the lifting mechanism 20 to promptly operate to lift the lifter 22 to the first or second lifted position upon underride contact. Further, the lifting driver 24 of the lifting mechanism 20 may include the pinion 31, the transmission gear 32 in mesh with the second pinion gear 31B of the pinion 31, and the rack 33 provided on the lifter 22 and being in mesh with the transmission gear 32. The transmission gear 32 may have a larger diameter than the second pinion gear 31B. Accordingly, the driving force of the lifting actuator 25 is amplified and transmitted to the lifter 22. Accordingly, it is possible to lift the hood appropriately.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. As used herein, the term "collision" may be used interchangeably with the term "contact".

One or more of the first contact detection sensor 71, the second contact detection sensors 72, the third contact detection sensors 73, and the ECU 70 in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the first contact detection sensor 71, the second contact detection sensors 72, the third contact detection sensors 73, and the ECU 70. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the first contact detection sensor 71, the second contact detection sensors 72, the third contact detection sensors 73, and the ECU 70 in FIG. 2.

The invention claimed is:

1. An occupant protection apparatus to be applied to a vehicle, the occupant protection apparatus comprising:
    a contact detector configured to detect frontal contact of the vehicle;
    a control processor comprising a contact determination unit configured to determine whether the frontal contact of the vehicle is underride contact based on a result of detecting by the contact detector;
    a lifting mechanism comprising
        a lifting member disposed below a rear end part of a hood in a downward direction of the vehicle, the hood being disposed on a frontal part of the vehicle, and
        a lifting driver configured to transmit a driving force to the lifting member; and
    an anchor mechanism disposed below the lifting mechanism in the downward direction of the vehicle, the anchor mechanism comprising
        an anchor member configured to project from an underfloor of the vehicle in the downward direction of the vehicle when being operated, and
        an anchor driver configured to transmit a driving force to the anchor member,
    wherein, when the contact determination unit determines that the frontal contact is the underride contact, the rear end part of the hood is lifted by the lifting mechanism, and the anchor driver is operated by the control processor to cause the anchor member to project from the underfloor of the vehicle in the downward direction of the vehicle and come into contact with a ground.

2. The occupant protection apparatus according to claim 1, wherein the lifting mechanism is configured to lift the rear end part of the hood to a position corresponding to an occupant's head position in a vertical direction of the vehicle when viewed from a front side of the vehicle.

3. An occupant protection apparatus to be applied to a vehicle, the occupant protection apparatus comprising:
    circuitry configured to detect frontal contact of the vehicle and determine whether the frontal contact of the vehicle is underride contact based on a result of detecting;
    a lifting mechanism comprising
        a lifting member disposed below a rear end part of a hood in a downward direction of the vehicle, the hood being disposed on a frontal part of the vehicle, and
        a lifting driver configured to transmit a driving force to the lifting member; and
    an anchor mechanism disposed below the lifting mechanism in the downward direction of the vehicle, the anchor mechanism comprising
        an anchor member configured to project from an underfloor of the vehicle in the downward direction of the vehicle when being operated, and
        an anchor driver configured to transmit a driving force to the anchor member,
    wherein, when the circuitry determines that the frontal contact is the underride contact, the rear end part of the hood is lifted by the lifting mechanism, and the anchor driver is operated by the circuitry to cause the anchor member to project from the underfloor of the vehicle in the downward direction of the vehicle and come into contact with a ground.

* * * * *